US012482622B2

(12) United States Patent
Montgomery

(10) Patent No.: US 12,482,622 B2
(45) Date of Patent: Nov. 25, 2025

(54) DEVICES AND SYSTEMS FOR CONTROLLING CIRCUIT BREAKERS AND METHODS FOR USING SAME

(71) Applicant: ProductIf Solutions LLC, Dacula, GA (US)

(72) Inventor: Jackson D. Montgomery, Dacula, GA (US)

(73) Assignee: ProductIf Solutions LLC, Dacula, GA (US)

( * ) Notice: Subject to any disclaimer, the term of this patent is extended or adjusted under 35 U.S.C. 154(b) by 261 days.

(21) Appl. No.: 17/978,055

(22) Filed: Oct. 31, 2022

(65) Prior Publication Data

US 2023/0134021 A1 May 4, 2023

Related U.S. Application Data

(60) Provisional application No. 63/274,160, filed on Nov. 1, 2021.

(51) Int. Cl.
*H01H 71/52* (2006.01)
*H01H 71/02* (2006.01)
*H02H 1/00* (2006.01)

(52) U.S. Cl.
CPC ........ *H01H 71/52* (2013.01); *H01H 71/0264* (2013.01); *H02H 1/0061* (2013.01)

(58) Field of Classification Search
CPC .. H01H 3/00; H01H 3/02; H01H 3/04; H01H 3/30; H01H 3/3005; H01H 3/3015;
(Continued)

(56) References Cited

U.S. PATENT DOCUMENTS

| | | | | |
|---|---|---|---|---|
| 3,171,920 A * | 3/1965 | Klein | ..................... | H01H 3/264 335/71 |
| 6,522,227 B1 * | 2/2003 | Mody | .................... | H01H 71/70 335/14 |

(Continued)

FOREIGN PATENT DOCUMENTS

CN 207818458 U 9/2018

OTHER PUBLICATIONS

International Search Report and Written Opinion dated Apr. 27, 2023 cited in Application No. PCT/US22/48489, 10 pgs.

*Primary Examiner* — Anthony R Jimenez
(74) *Attorney, Agent, or Firm* — BEKIARES ELIEZER LLP

(57) ABSTRACT

Disclosed herein are devices and systems for controlling circuit breakers, such as in a breaker box. In one aspect, the device includes a substantially planar panel configured to removable secured to a breaker box; at least one frame member connected to the panel; at least one platform connected to the frame member and configured to travel along the frame member; at least one drive unit configured to move the platform along the frame member; at least one actuator unit configured to actuate at least one circuit breaker; exerting a force; at least one controller configured to control operation of at least one device component based on instructions regarding operation of the device; and at least one power source configured to power at least one device component. Also disclosed herein are methods for using the disclosed devices and systems.

18 Claims, 9 Drawing Sheets

(58) Field of Classification Search

CPC ...... H01H 3/3031; H01H 3/3042; H01H 3/32; H01H 3/38; H01H 3/42; H01H 1/36; H01H 1/42; H01H 1/44; H01H 1/20; H01H 1/2041; H01H 9/00; H01H 9/02; H01H 9/0235; H01H 9/20; H01H 9/22; H01H 9/24; H01H 2009/02; H01H 71/00; H01H 71/02; H01H 71/025; H01H 71/0214; H01H 71/52; H01H 71/0264; H01H 71/10; H01H 71/56; H01H 71/70; H01H 71/2472; H01H 19/24; H02H 1/0061

USPC .......................................................... 200/401

See application file for complete search history.

(56) References Cited

U.S. PATENT DOCUMENTS

| | | | | |
|---|---|---|---|---|
| 9,031,799 | B2 * | 5/2015 | Bae .......................... | H04Q 9/00<br>702/58 |
| 10,673,225 | B2 * | 6/2020 | Eriksen .................. | H01R 24/78 |
| 2012/0089267 | A1 | 4/2012 | Jewell | |
| 2019/0019259 | A1 | 1/2019 | Bazhinov | |

* cited by examiner

DEVICES AND SYSTEMS FOR CONTROLLING CIRCUIT BREAKERS AND METHODS FOR USING SAME

RELATED APPLICATION

Under provisions of 35 U.S.C. § 119(e), the Applicant claims benefit of U.S. Provisional Application No. 63/274,160 filed on Nov. 1, 2021, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF INVENTION

The present invention relates to methods, devices, and systems for controlling circuit breakers or electrical switches.

BACKGROUND OF THE INVENTION

Currently, "smart" switches exist that allow a user to remotely control a specific electrical outlet or a light, etc. and can operate with by allowing the user to control the power to these outlet and light in their home using an application on their phone. However, each light and/or outlet requires a smart switch, which can be costly when attempting to control power to a large number of lights and electrical outlets.

Smart breaker boxes which perform a similar function of allowing control of breakers exist, but these smart breaker boxes are expensive and require replacement of the entire breaker box and panel.

Accordingly, there remains a need for new devices and systems for controlling circuit breakers which are compatible with existing breaker boxes and circuit breakers. This need and other needs are satisfied by the various aspects of the present disclosure.

SUMMARY OF THE INVENTION

In accordance with the purposes of the invention, as embodied and broadly described herein, the invention, in one aspect, relates to devices and systems for controlling circuit breakers, such as in an electrical breaker box.

In another aspect, the invention relates to a device for controlling circuit breakers in a breaker box, the device comprising: a substantially planar panel configured to removable secured to a breaker box; at least one frame member connected to the panel; at least one platform connected to the frame member and configured to travel along the frame member; at least one drive unit configured to move the platform along the frame member; at least one actuator unit configured to actuate at least one circuit breaker; exerting a force; at least one controller configured to control operation of at least one device component based on instructions regarding operation of the device; and at least one power source configured to power at least one device component.

When a user operates the device, the user can remotely control or actuate breakers located in the breaker box to which the device is installed on.

In another aspect, the invention may allow a user to adjust the operating parameters by using a control unit. For example, the user may use a wireless device to control schedule and power consumption level at which to turn off one or more breakers.

In another exemplary aspect, the invention relates to a system, the system comprising: an electrical breaker box; an electrical panel comprising a plurality of slots configured to receive circuit breakers; a plurality of circuit breakers configured to install in the electrical panel slots; a substantially planar breaker box cover panel pivotably connected to the breaker box, and configured to cover a breaker box opening; at least one frame member connected to the cover panel; at least one platform [assembly] connected to the frame member and configured to travel along the frame member; at least one drive unit configured to move the platform along the frame member; at least one actuator unit configured to actuate at least one circuit breaker; at least one controller configured to control operation of at least one component based on instructions regarding operation of the system; and at least one power source configured to power at least one system component.

In another exemplary aspect, the invention relates to a method for controlling circuit breakers.

In further aspects, the invention also relates to methods for using the disclosed devices and systems.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION OF THE INVENTION

Figure 1:
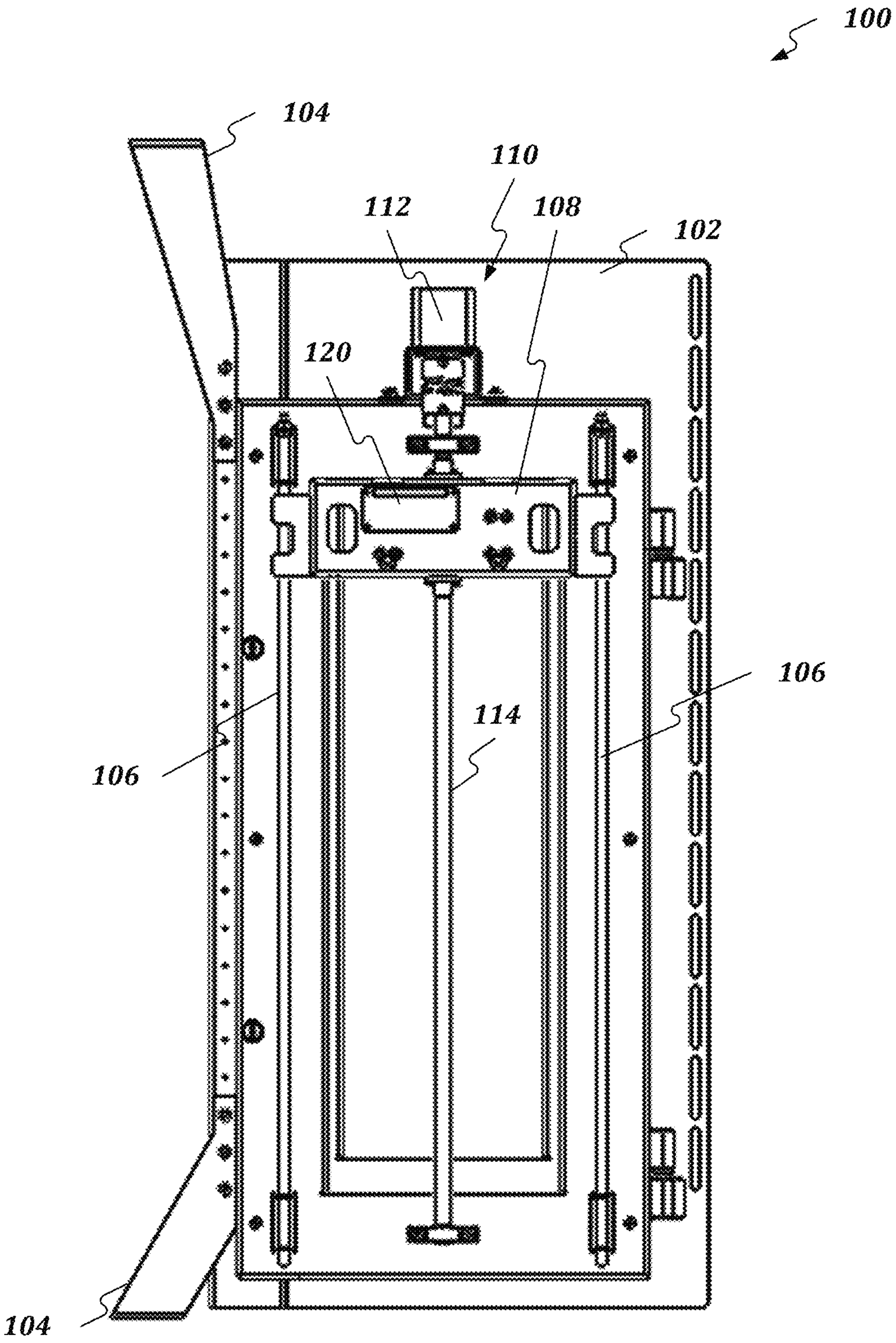
FIG. 1 shows a depiction of a system in accordance with an exemplary embodiment of the present invention.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term “comprising” can include the aspects “consisting of” and “consisting essentially of” Unless defined otherwise, all technical and scientific terms used herein have the same meaning as commonly understood by one of ordinary skill in the art to which this invention belongs. In this specification and in the claims, which follow, reference will be made to a number of terms which shall be defined herein.

As used in the specification and the appended claims, the singular forms “a,” “an” and “the” include plural referents unless the context clearly dictates otherwise. Thus, for example, reference to “a member” includes two or more members.

Ranges can be expressed herein as from one particular value, and/or to another particular value. When such a range is expressed, another aspect includes from the one particular value and/or to the other particular value. Similarly, when values are expressed as approximations, by use of the antecedent ‘about,’ it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as “about” that particular value in addition to the value itself. For example, if the value “10” is disclosed, then “about 10” is also disclosed. It is also understood that each unit between two particular units are also disclosed. For example, if 10 and 15 are disclosed, then 11, 12, 13, and 14 are also disclosed.

As used herein, the terms “about” and “at or about” mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is “about” or “approximate” whether or not expressly stated to be such. It is understood that where “about” is used before a quantitative value, the parameter also includes the specific quantitative value itself, unless specifically stated otherwise.

The terms “first,” “second,” “first part,” “second part,” and the like, where used herein, do not denote any order, quantity, or importance, and are used to distinguish one element from another, unless specifically stated otherwise.

As used herein, the terms “optional” or “optionally” means that the subsequently described event or circumstance can or cannot occur, and that the description includes instances where said event or circumstance occurs and instances where it does not. For example, the phrase “optionally affixed to the surface” means that it can or cannot be fixed to a surface.

Disclosed are the components to be used to manufacture the disclosed devices and articles of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Devices and Systems

As briefly described above, the present disclosure relates, in various aspects, to devices and systems for circuit breakers or electrical switches, such as those found in homes used to control power transmission. As used herein, the terms "circuit breaker" and "switch" may be used interchangeably to indicate electrical device for stopping the flow of current in an electric circuit. In further aspects, the disclosed devices may be used to replace the door of a pre-installed breaker box, or to attach to an existing door of a pre-installed breaker box. The device may allow the user to control the lights, appliances, and electricity inside their house with the use of their smartphone or computer, and without replacing the breaker box itself. In still further aspects, the device may use various motors to move about the device and/or actuate switches or breakers in a breaker box. In yet further aspects, the device may comprise a built-in controller (e.g., a computing device) which may connect to a home network and control operation of the switches or circuit breakers (e.g., actuating on or off) by using an application or website and an interface (e.g., a series of buttons) that the user links to each breaker. In even further aspects, the device may be powered from electrical panel within the breaker box through the use of a breaker connected to the device and installed in the electrical panel. The device and systems of the present invention can effectively allow users to control all of the electric flow to devices inside their house and, potentially eliminate the need for multiple "smart" switches to control every device inside their home.

In one aspect, the present disclosure provides a device having a substantially planar panel configured to be removably secured to a breaker box; at least one frame member connected to the panel; at least one platform connected to the frame member and configured to travel along the frame member; at least one drive unit configured to move the platform along the frame member; at least one actuator unit configured to actuate at least one circuit breaker; exerting a force; at least one controller configured to control operation of at least one device component based on instructions regarding operation of the device; and at least one power source configured to power at least one device component.

In another aspect, the present disclosure provides a system for controlling circuit breakers, the system comprising: an electrical breaker box; an electrical panel comprising a plurality of slots configured to receive circuit breakers; a plurality of circuit breakers configured to install in the electrical panel slots; a substantially planar breaker box cover panel pivotably connected to the breaker box, and configured to cover a breaker box opening; at least one frame member connected to the cover panel; at least one platform [assembly] connected to the frame member and configured to travel along the frame member; at least one drive unit configured to move the platform along the frame member; at least one actuator unit configured to actuate at least one circuit breaker; at least one controller configured to control operation of at least one component based on instructions regarding operation of the system; and at least one power source configured to power at least one system component.

According to various aspects of the invention, the devices, methods, and systems of the present disclosure can comprise multiple configurations. FIGS. 1-4 show depictions and perspectives of exemplary embodiments of devices, methods and systems in accordance with the present invention.

As described herein, the invention may include one or more circuit breaker control devices in a system. In still further aspects, each device may comprise a plurality of drive units, actuator units, and/or various hardware for positioning and controlling the device components.

In various aspects, the present invention comprises a panel configured for use in the disclosed devices, for example, a panel may detachably connect or attach with a breaker box. In further aspects, the panel may comprise a cover or door configured to be pivotably connected to at least one edge of the breaker box. In still further aspects, the panel may comprise at least one frame member or rail connected or secured to the panel. In yet further aspects, the device may comprise a plurality of frame member or rails to be secured to a panel or door covering the breaker box. In further aspects, one or more (e.g., each) frame member may comprise an elongated cylindrical member, or the like. In various aspects, the frame member is configured to allow the drive unit to travel up and down the member. In some embodiments, the frame members may be adjustable. For example, the frame members may be comprise a telescoping cylindrical member that may be adjustable between a plurality of lengths, or may be continuously adjustable between a minimum length and a maximum length.

In aspects, the panel may be configured to house or protect one or more device components. In further aspects, the panel may be sized and shaped to conform to the dimensions of various breaker box types and models. In some aspects, the panel may be substantially square to fit a square breaker box. In other aspects, the panel may be rectangular shaped to fit a larger rectangular shaped breaker box.

The breaker box may be any shape. For example, the breaker box may be in the shape of a three-dimensional polyhedron (e.g., a rectangular prism) and walls of the breaker box may define an interior space or interior sections for containing the electrical panel and circuit breakers. Any other shape (as used herein, the term shape is used in the broad sense of three-dimensional shapes) may be employed, so long as the shape is large enough and structured so as to be able to contain the electrical system components and various working components of the invention as disclosed herein.

In aspects, the drive unit may be configured to produce a force or otherwise move a platform to a desired position. In further aspects, the drive unit may comprise at least one of a motor, actuator, screw, worm screw, barrel screw, wheel and axle, cam, rod, gear, track, belt, chain, rack and pinion, or the like. In some aspects, the drive unit may comprise a stepper motor. In yet further aspects, the drive unit may comprise any drive source or desired means for exerting a force or capable of moving the platform linearly in a bidirectional manner. For example, the drive unit may be configured to move the platform up and down a frame member or rail. In some aspects, the movement can enable actuator units to be in a position for actuating or flipping switches and/or breakers contained in the breaker box. In still further aspect, the drive unit may be programmed move in a predefined manner. In yet further aspects, the drive unit may comprise any size drive unit or motor.

In some aspects, the device may comprise at least one actuator unit. In other aspects, the device may comprise a plurality of actuator units. In further aspects, one or more of the actuator units may be configured to actuate or flip a switch or breaker. As a non-limiting example, a breaker box may comprise two parallel columns of switches or breakers, and the device may include two actuator units positioned to actuate the two parallel columns of switches. In still further aspects, the actuator unit may include any desired means for actuating a switch. In some aspects, the actuator unit may comprise at least one of: an actuator, rotary actuator, linear actuator, motor, screw, worm screw, barrel screw, wheel and axle, cam, rod, gear, track, belt, chain, rack and pinion, or the like. In some aspects, the actuator unit may comprise a servomotor. In further aspects, the actuator unit may comprise any size actuator unit or motor. In other aspects, the actuator motor may comprise one or more arms configured to flip a switch or breaker back and forth.

Figure 2:
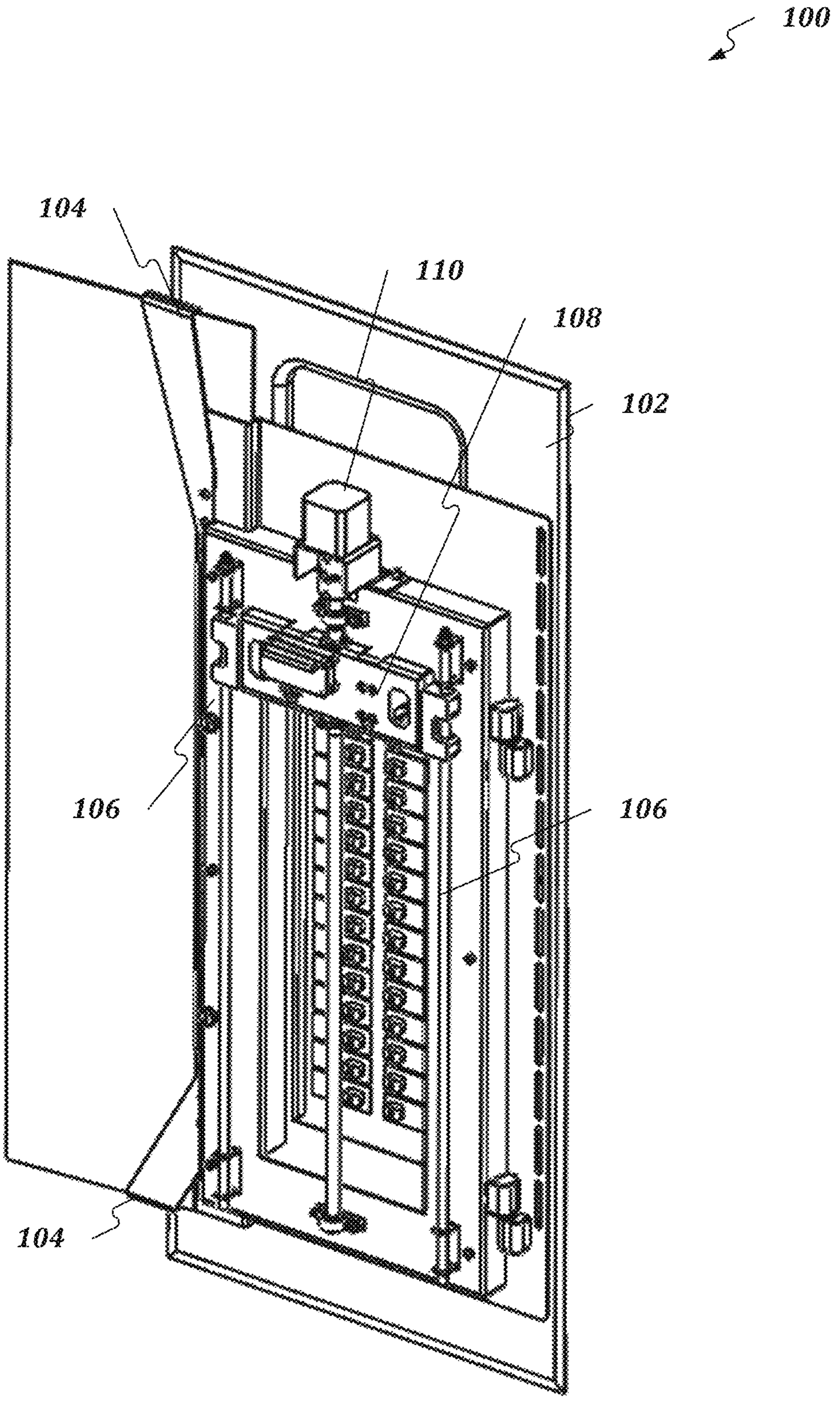
FIG. 2 shows a depiction of the system of FIG. 1, installed in an operating environment.

FIGS. 1-4 show various depictions of an actuation device 100 including components and configurations having various means for controlling (e.g., actuating) switches or circuit breakers in accordance with embodiments of the present invention. As shown in FIG. 2, the device 100 may be mounted to a breaker box. The breaker box may correspond to a location where electrical power is received at a building, such as a residential dwelling. In embodiments, the breaker box may be a traditional breaker box designed for residential use. For example, the breaker box may be configured for placement in residential construction, to be mounted between studs set a standard distance apart from one another (e.g., 16 inches, 24 inches, etc.). The breaker box may house a panel comprising a plurality of circuit breakers, which are electrical safety devices designed to protect an electrical circuit from damage caused by an overcurrent or short circuit. Each circuit breaker may be connected to a particular electrical circuit within the residential dwelling. The breaker box may include a door that, when in a closed position, substantially covers the breaker panel.

Figure 3:
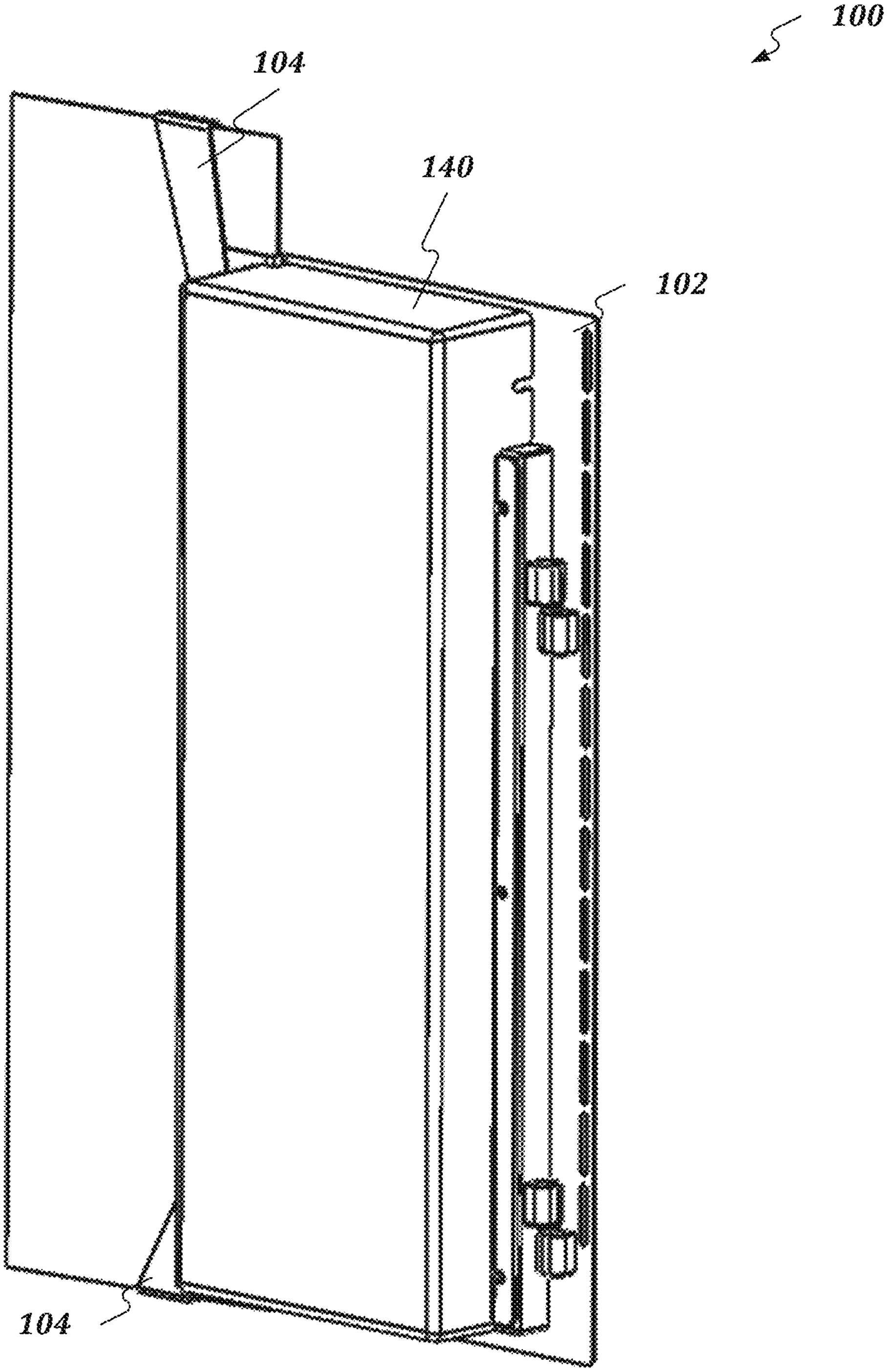
FIG. 3 shows another depiction of the system of FIG. 1, installed in the operating environment.

In exemplary aspects, and as shown in FIGS. 1-3, the device 100 may comprise a panel 102 configured to cover at least a portion of a breaker box, one or more mounting brackets 104 for mounting the device to a breaker box, one or more rails 106 defining a travel path for the device 100, a platform 108 configured to travel along the one or more rails, and a drive unit 110 operatively connected to the platform and configured to move the platform along the rails.

In embodiments, the one or more mounting brackets 104 may be configured to removably mount the panel 102 such that the panel covers at least a portion of the breaker box, as shown in FIG. 2. As shown in FIGS. 1-3, the device 100 may include two mounting brackets 104, though more or fewer mounting brackets are contemplated. In embodiments, the mounting brackets 104 may interface with a top and/or bottom edge of the door to the breaker box. In some embodiments, the mounting brackets 104 may retain the panel 102 in a fixed position relative to the breaker box. In other embodiments, the mounting brackets 104 may be hinged, such that the panel 102 may pivot about the hinge to allow the panel to swing away from the breaker box. In embodiments, the panel 102 may further be attached to the breaker box by one or more fasteners, such as thumb screws, regular screw, magnets, and/or any other permanent or semipermanent fastener.

In embodiments, the one or more rails 106 may be mounted to the panel 102, such that the rails are positioned adjacent to an interior surface of the door (e.g., a surface of the door that faces the breaker panel when the door is in the closed position. Alternatively, the one or more rails 106 may be mounted on a surface of the breaker box. In embodiments, each of the one or more rails 106 may have a fixed length that substantially corresponds to a length of the breaker box. Alternatively, each of the one or more rails 106 may have a variable length. For example, each rail 106 may be a telescoping rail having an adjustable length. In some embodiments, the rail 106 may be adjustable among a plurality of predefined lengths. Alternatively, the rail 106 may be continuously adjustable between a minimum length and a maximum length. The minimum length and maximum lengths may be set based on, for example, minimum and maximum lengths of commercially-available breaker panels. One of skill in the art will recognize that minimum and maximum lengths of the rails 106 may be varied without departing from the scope of the disclosure.

In embodiments, one or more (e.g., each) of the rails 106 may be an elongate metal rod, having a fixed shape (e.g., cylindrical, squared, rectangular, triangular, etc.). In some embodiments, each of the one or more rails 106 may have the same shape. In other embodiments, at least one of the one or more rails 106 may have a shape that is different from others of the one or more rails.

Figure 4:
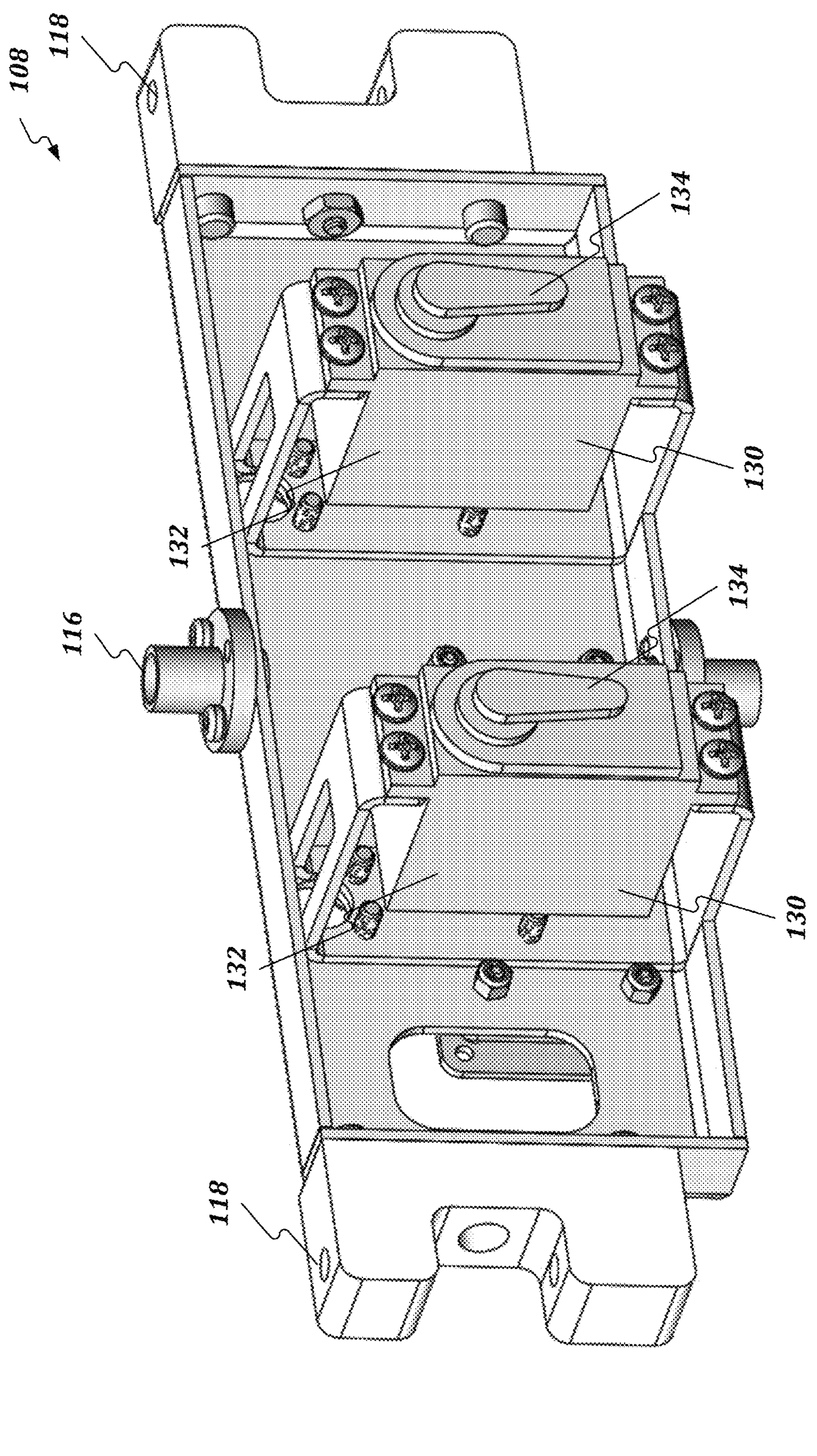
FIG. 4 shows a detailed view of the platform of the system.

The device 100 may further include the platform 108. The platform 108 may be operatively connected to a drive unit 110 and a controller 120. As best shown in FIG. 4, the platform 108 may include one or more actuator units 130 mounted thereon.

In aspects, the drive unit 110 may be configured to produce a force or otherwise move the platform 108 to a desired position. In particular, the drive unit 110 may comprise any drive source or desired means for exerting a force or capable of moving the platform linearly in a bidirectional manner. For example, the drive unit 110 may be configured to move the platform up and down a frame member or rail. In aspects, the drive unit 110 may comprise one or more of a motor, an actuator, a screw, a worm screw, a barrel screw, a wheel and axle, a cam, a rod, a gear, a track, a belt, a chain, a rack and pinion, and/or the like. In some aspects, the drive unit 110 may comprise a stepper motor.

As shown in FIGS. 1-3, the drive unit 110 includes a motor 112 and a worm screw 114. The worm screw 114 passes through a first aperture 116 defined by the platform 108, such that rotation of the screw 114 causes movement of the platform. In embodiments, the platform 108 may further include one or more second apertures 118 configured to allow the one or more rails 106 to pass therethrough, helping to stabilize the platform 108. As shown in FIGS. 1, 2, and 4, the first aperture 116 is preferably located at approximately the center of the platform 108, while the second apertures are disposed near the platform edges, though other configurations are contemplated. Any configuration that stabilizes the platform 108 and allows the platform 108 to traverse vertically along the rails 106 may be used.

The platform 108 may include one or more actuator units 130 mounted thereon. One or more (e.g., each) of the actuator units 130 may be configured to actuate or flip a switch or breaker. As a non-limiting example, a breaker box may comprise two parallel columns of switches or breakers, and the platform 108 may include two actuator units 130 positioned to actuate the two parallel columns of switches or breakers.

The actuator unit 130 may include any desired means for actuating a switch or breaker. As non-limiting examples, the actuator unit 130 may comprise at least one of: an actuator, a rotary actuator, a linear actuator, a motor, a screw, a worm screw, a barrel screw, a wheel and axle, a cam, a rod, a gear, a track, a belt, a chain, a rack and pinion, and/or the like. In some aspects, the actuator unit 130 may comprise a servomotor. The actuator unit 130 may comprise any size actuator unit or motor sufficient to actuate the switch or breaker. In some aspects, the actuator unit 130 may comprise a motor 132 having one or more arms 134 operatively connected thereto. The one or more arms 134 may be configured to actuate a switch or breaker. For example, the arm 134 may rotate, oscillate, or otherwise move to physically actuate a switch located substantially near the actuator 130.

In operation, the drive unit 110 may adjust a position of the platform 108 (e.g., via rotation of the worm screw 114 in communication with the first aperture 116) such that the actuator unit 130 is located substantially adjacent to a breaker to be actuated, and thereafter the actuator unit 130 may actuate the breaker (e.g., flip the breaker from an "on" position to an "off" position, or from an "off" position to an "on" position).

The platform 108 may be operatively connected to a controller 120 configured to control the platform 108, including controlling the drive unit 110 and/or the one or more actuator units 130. In some embodiments, the controller 120 may include any hardware and/or software configured to control the platforms and/or components thereof. As non-limiting examples, the controller 120 may include a circuit design specifically for controlling the platform 108 (e.g., using a field-programmable gate array or a purpose-built computing device), or a computing device including a processor configured to execute software for controlling the platform. As a particular example, the controller 120 may include a system on a chip or a single board computer (e.g., a computing device such as the Raspberry Pi 3). The controller 120 may include additional hardware and/or software for controlling particular devices associated with the platform 108, such as the drive unit 110 and/or the actuator units 130. As a particular example, the controller 120 may include one or more extra control boards, also known as hardware attached on top ("hat"). In particular, one or more hats (e.g., Adafruit hats) may be used for controlling the drive unit 110 and/or the actuator units 130.

The device 100 may be connected to a main power line associated with the dwelling. For example, the device 100 may be connected to the main power line by a breaker with wiring attached to the device, allowing the device to be plugged in using a power converter. In embodiments, the wiring may be connected to the drive unit 110, the controller 120, and/or the actuator units 130.

As shown in FIG. 3, in some embodiments, the device 100 may include a housing 140 configured to substantially enclose the device 100 and the breaker box. In some embodiments, the housing 140 may be attached to the breaker box using semi-permanent fasteners, such as screws or hinges. Alternatively, the housing 140 may be secured to the panel 102 using fasteners, such as screws or hinges. In embodiments, the housing may be formed from any material that prevents interference with motion of the device (e.g., the platform 108, the drive unit 110, and/or the actuators 130). In embodiments, the housing 140 may be formed from any resilient material that can be used to enclose the device 100. For example, the housing 140 may be formed from metal, plastic, fiberglass, acrylic, wood, or any other material that prevent access to the device 100.

The drive unit 110 may be positioned anywhere on the device 100. Advantageously, different embodiments of the device 100 may have different features with respect to the positioning of the drive unit 110 and/or the actuator units 120. For example, one or more actuator units 120 may be positioned on the platform 108 based on relative placement of circuit breakers within the breaker box (e.g., with different placements corresponding to different standards and or different breaker box manufacturers). Placement of the drive unit 110 may be selected so as not to interfere with the one or more actuator units 120. In some embodiments, a user may be able to choose where to position the drive unit 110 and/or the actuator units 120 with respect to the position and location of the circuit breakers within the breaker box. In other embodiments, a user may have limited choice in where to position the actuator units. In yet other aspects, the device may automatically determine the positional requirements, and thus the actuator units may be fixed to the frame assembly so the user may have little, if any, ability in positioning of the device along the frame member.

In embodiments, the device 100 may be controlled by a control unit (not shown) external to the device. The control unit may be configured to communicate with the device 100 and/or device components (e.g., the controller 120). The control unit may communicate with the device via wired and/or wireless signals. In some embodiments, the control unit may be a hardware control unit configured specifically to communicate with the device. Alternatively, the control unit may be a device, such as a smartphone, tablet computer, laptop computer, personal digital assistant, smartwatch, and/or the like operating an application or accessing a website to communicate with the service 100. In embodiments, the device 100 or portions thereof (e.g., the controller 120) may include a transceiver configured to transmit data to and/or receive data from the controller. The controller 120 may further be configured to cause the appropriate elements of the device 100 to perform one or more actions based at least in part on the data received from the control unit. Additionally or alternatively, the controller 120 may transmit data to the control unit and/or any other hardware external to the device 100 in response to receipt of data from the control unit. For example, a user can access an application (or website) via the control unit to select one or more circuit breakers for actuation (e.g., to toggle between an "on" state and an "off" state). When selecting a circuit breaker (e.g., using a button or other user interface element in the application or website), one or more corresponding instructions may be sent to the device controller 120. Responsive to receipt of the one or more instructions, the controller 120 may activate the drive unit 110 to move the platform 108 into a position associated with the selected breaker. The controller 120 may further activate an actuator unit 130 to toggle the switch or circuit breaker between an "on" state and an "off" state.

The controller 120 may include elements to carry out various functions. For example, the controller 120 may include a receiver/transmitter, transceiver, and/or antenna for communicating wirelessly with the control unit and/or any other devices. The controller 120 may include "smart" technology such as a microprocessor or other processing device to process and execute received instructions, information, and/or signals received from the control unit or any other hardware external to the device 100. As another example, the controller 120 may be connected respectively by one or more wires (and/or other transmitters or carriers, including wireless transmitters or carriers) to the drive unit 110 and/or the one or more actuator units 130 to transmit instructions/information and/or to receive information therefrom.

In some embodiments, the device 100 may comprise a computer with an operating system that is configured to execute code in a particular programming language, such as Python (e.g., Raspberry Pi with Python Coding for Website/App) or another language to serve as the controller 120. In other embodiments, the computer may run an operating system such as Raspbian, and may be configured to execute code via a website or application to initiate each action of the drive unit 110 and/or the actuator unit 130. In still other embodiment, the controller 120 may include one or more sub-controllers for operating the actuator unit 130 and/or the drive unit 110. As particular examples of sub-controllers that may be used, the controller 120 may include (as non-limiting examples) an Adafruit Servo/PWM Pi hat (which allows for operation of the actuator unit 130) and/or an Adafruit DC+Stepper Motor hat (which allows for operation of the drive unit 110).

In various aspects, the platform 108, the drive unit 110, the actuator unit 130, and/or the controller 120 may require a power source, depending on the configuration and construction. An exemplary power source may include any type of power source such as, but not limited to, a connection to the circuit breaker, an alternating current source (e.g., a wall plug), a solar or other photovoltaic cell, a miniature reactor, a mechanical source such as a flywheel or springs, a disposable or rechargeable battery, and/or the like. Other power source(s) are possible, and any suitable power source may be used.

In some embodiments, the controller 120 may be included in or integrated within various portion of the platform assembly 108. In other embodiments, the controller 120 may be disposed on the panel 102. In still further embodiments, the controller 120 may be disposed in a housing attached to or in communication with the device 100. Other locations are possible, and may depend on the size and/or other characteristics of the controller 120, etc. In particular, the controller 120 may be disposed in any practical location within and/or adjacent to the device 100 without departing from the scope of the invention. In various aspects, the device arrangement and construction of the systems can be configured to correspond to various layouts, configurations, and sizes of circuit breakers with a breaker box. In further aspects, the drive units can be connected to or otherwise disposed on portions of the frame member corresponding to any desired location of a given circuit breaker position.

In various aspects, the device component characteristics and configuration, such as, for example, size and dimensions, can be configured to adjust for breaker box size and circuit breaker layout. In further aspects, and as shown in the figures, the device components can be removably mounted to allow interchange and/or replacement. In further aspects, one or more actuator unit 120 can be detachably connected to the platform 104 to allow interchange and/or replacement of one or more units (individually or as a unit with the platform). Such configurations allow users, purchasers, retailers, or others to select desired configurations to user's breaker box and circuit breaker types, or to repair or replace defective or damaged device components.

Figure 5:
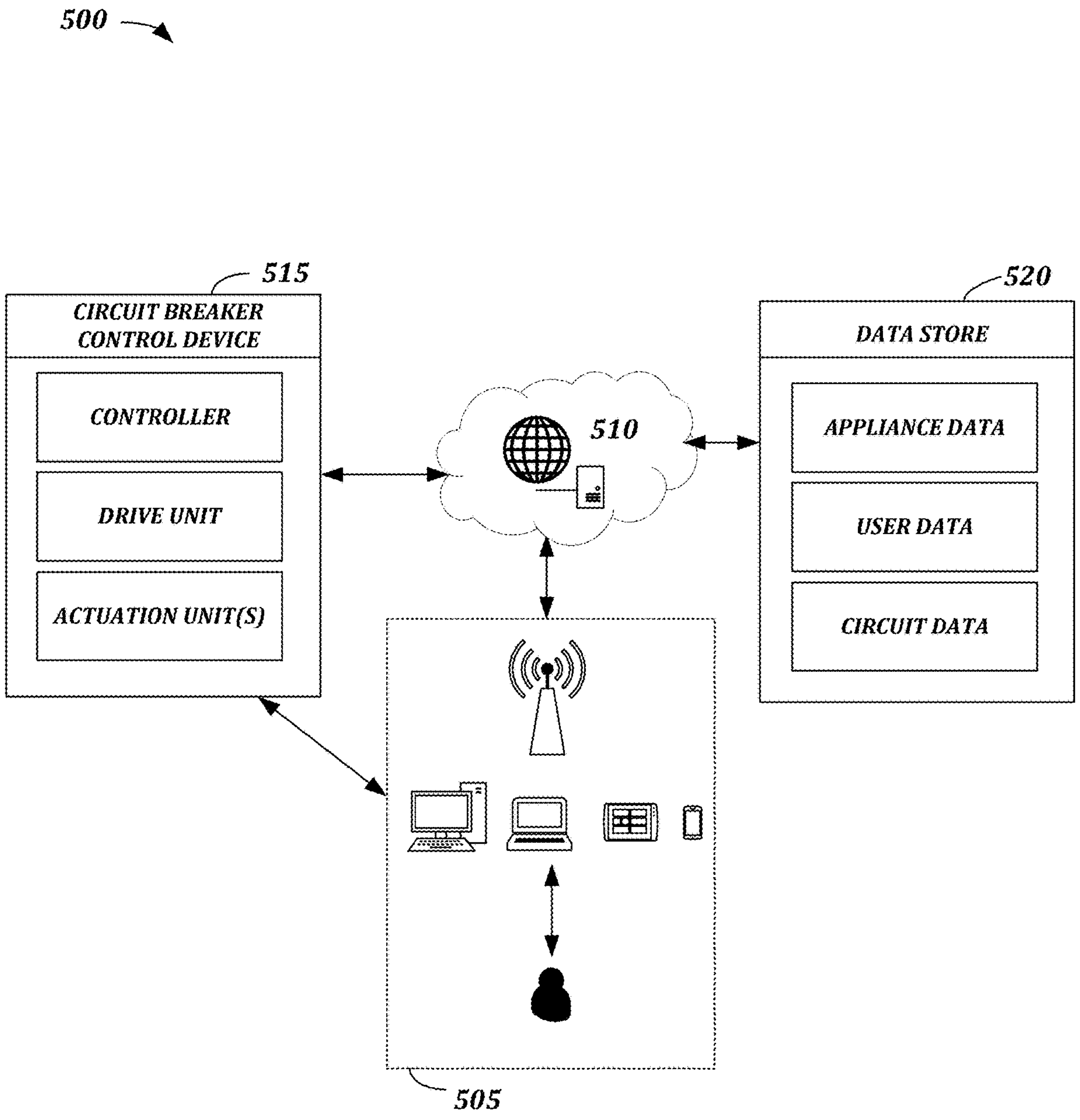
FIG. 5 shows an operating environment for the system.

FIG. 5 illustrates one possible operating environment through which a platform consistent with embodiments of the present disclosure may be provided. By way of non-limiting example, a circuit breaker control platform 500 may be hosted on a server 510, such as a centralized server (e.g., a cloud computing service), a dedicated server, or a single device in communication with a circuit breaker control device 515 (e.g., device 100). A user device 505 may access platform 500 through a software application. The software application may be embodied as, for example, but not be limited to, a website, a web application, a desktop application, and a mobile application compatible with a computing device 1500.

As will be detailed with reference to FIG. 9 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

In embodiments, the user device 505 may access the platform 500 to activate, deactivate, and/or otherwise control the operation of the device 515 (e.g., by causing the device 510 to toggle a state of one or more switches or circuit breakers). In some aspects, the user device 505 may access the platform 500 via a device equipped with wireless technology to communicate between the user and the server 510 and/or the device 515 using wireless communication techniques.

The user device 505 may allow a user to create an account and register as a user, including creating a user ID and password associated with the account. The account information may be transferred to the server 510 for processing and or storage (e.g., to a data store 520). Thereafter, the user may provide information associated with the breaker panel to be controlled using the device 510. In embodiments, providing the information may comprise providing information associated with a model of circuit breaker panel installed in a dwelling, providing a photograph of the circuit breaker panel, manually entering information associated with the panel, and/or the like. After providing information associated with the panel, the user may provide information associated with each circuit connected to the circuit breaker. The provided information may include, for example, a description of the circuit (e.g., a location within the dwelling and/or any other information useful to the user for identifying the circuit), a list of one or more devices connected to the circuit, and/or the like.

The information provided by the user device 505 may be received at the server 510 for processing and or storage in the data store 520. The data store 520 may include a data base and/or any other data storage devices. In some embodiments, the data store 520 may be remote from the server 510. Alternatively or additionally the data store 520 may include one or more data storage device in the server 510.

In some embodiments, the server 510 may display, on the user device 505, at least one of a graphic image of the breaker box and circuit breaker layout to allow a user to select one or more switches or circuit breakers for actuation. In other embodiments, the user device may present the switches and a circuit breakers as a list, including for example, a breaker number, a description of the circuit controlled by the breaker, and/or any other identifying information provided by a user and useful in identifying the breaker.

The user device 505 may receive, from the user, an indication of one or more commands to be executed by the device 515. For example, the user may activate the device 515, deactivate the device 515, and/or select one or more switches or circuit breakers for actuation by the device 515. In some embodiments, the user may optionally select one or more additional criteria for actuating the switch. For example, the additional criteria may be a time of day (e.g., to establish a schedule), a particular period of time elapsing (e.g., to function as a timer), a particular duration of current draw in the circuit (to prevent devices from remaining active for too long), a particular amount of time passing without meeting a threshold current draw in the circuit (to shut off circuits having no active devices), or any other criteria. In embodiments, each of the one or more circuit breaker actuations specified by the user may have independently selected criteria. In other embodiments, a user may select a group of circuit breakers to eb actuated based on the same one or more criteria. In some embodiments, when no criteria are associated with the actuation of a switch or circuit breaker, it may be assumed that the wishes to actuate the circuit breaker substantially immediately.

Following receipt of one or more commands from the user, the user device 505 may cause the device 515 to perform the one or more commands. In particular, the user device may transmit, to the device 515, one or more instructions which, when executed, cause the device to perform the one or more commands received from the user. In some embodiments, the user device 505 may transmit (e.g., directly or via the server 510) the instructions to the device 515 substantially immediately upon receipt of the commands, and the device 515 may monitor any criteria established by the received commands. Alternatively, the user device 505 and/or the server 510 may monitor any criteria established by the received commands, and may transmit the instructions to the device 515 in response to the one or more criteria being met.

Responsive to receiving one or more instructions, the device 515 may execute the received instructions. In particular, the user device 505 and/or the server 510 may optionally monitor the circuit to determine if the one or more criteria are satisfied, and may transmit the instructions to the device 515 upon satisfaction of the criteria. The device 515 may actuate the one or more switches or circuit breakers indicated in the received instructions. The one or more circuits or switches may be actuated in turn. For example, the device 515 may move to an area adjacent to a first circuit breaker, of the one or more circuit breakers. Thereafter the device 515 may actuate the first circuit breaker (e.g., toggling the first breaker between an "on" position and an "off" position).

In some embodiments, the user device 505 and/or the server 510 may receive data regarding electrical usage in the one or more circuits connected to the circuit breaker panel from the device 515. In particular, the device 515 may monitor, as non-limiting examples, a current draw for each circuit, a peak current draw for each circuit, an average current draw for each circuit, an amount of time during which each circuit draws power, an aggregate current draw for the dwelling, and/or any other information associated with the electrical usage of the dwelling and/or the circuits contained therein. The user device 505 may transmit that data to the server 510. In turn, the server 510 may use the received data as a basis for determining whether one or more switches or circuits have met criteria for actuation.

In some embodiments, the user device 505 may receive information related to which device are connected to each circuit in the dwelling. For example, appliance information (e.g., appliance type, manufacturer, model number or identifier, etc.) associated with each appliance (e.g., stove, refrigerator, dishwasher, washing machine, dryer, etc.) may be logged at the server 510, together with which circuit each appliance is connected to. The device 515 may monitor current draw and/or power consumption on one or more circuits to which the appliances are connected, and may transmit this information to the server 510. In this way, the platform 500 may estimate power use by one or more appliances. The platform 500 may further store or access data related to the appliances in a power usage database. The platform 500 may compare the data received from the user to average data for that appliance category, that appliance manufacturer, and/or that appliance model. In this way, the platform 500 may provide reports about energy usage at the dwelling and help a user to determine which appliances should be replaced to improve energy efficiency. The reports may help to diagnose problems with appliances and/or to alert a user to excess energy waste.

C. Platform Operation

The platform may receive, from a user, an indication of one or more switches or circuits to be actuated. The platform may form a set of instructions which, when executed by an actuation device, cause the actuation device to actuate the indicated switches and/or circuit breakers.

Figure 6:
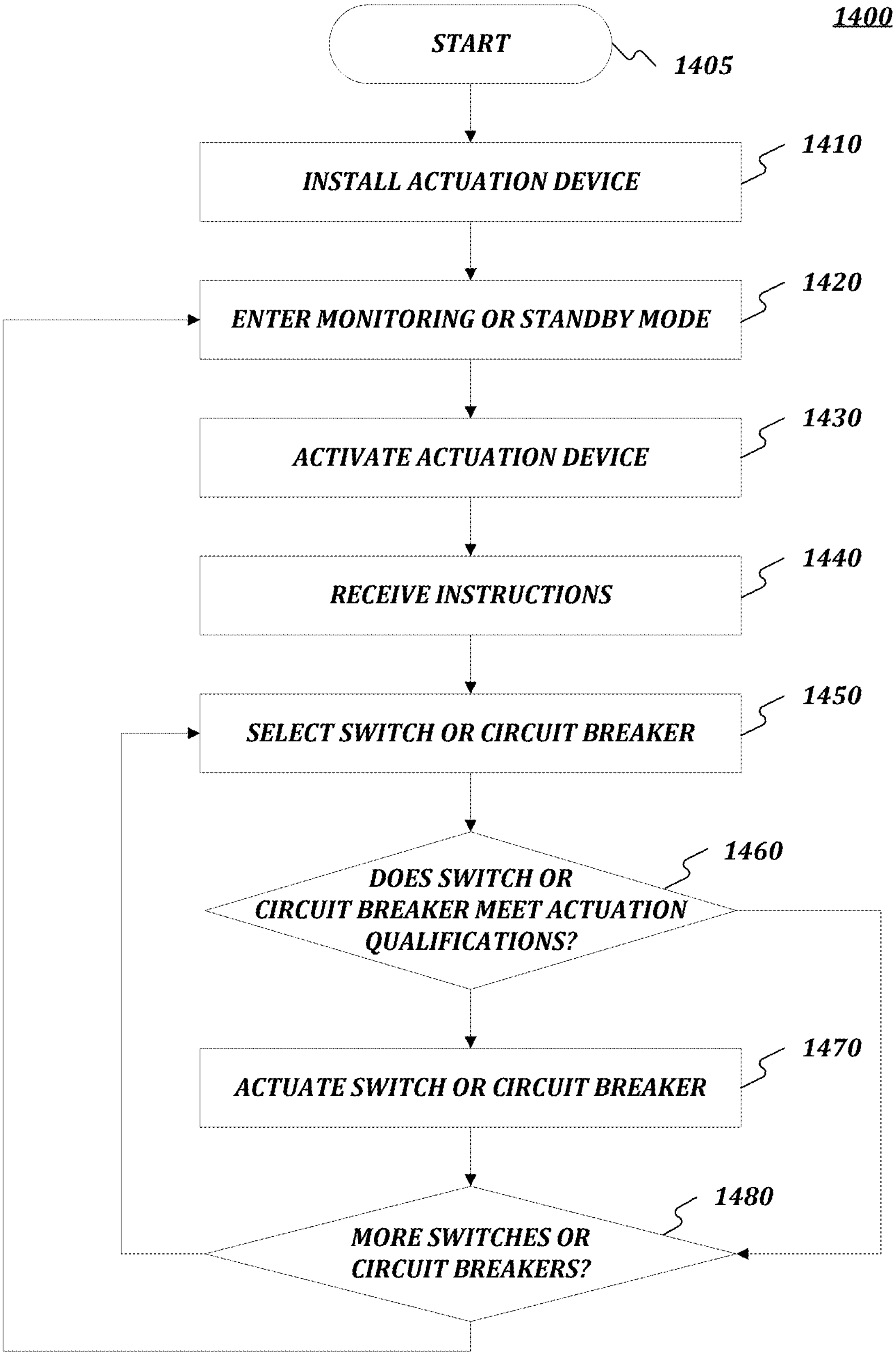
FIG. 6 illustrates a flowchart of a method for using the system.

FIG. 6 is a flow chart setting forth the general stages involved in a method 1400 consistent with an embodiment of the disclosure for providing the circuit breaker actuating platform 500. Method 1400 may be implemented using a computing device 1500 as described in more detail below with respect to FIG. 9.

Although method 1400 has been described to be performed by platform 500, it should be understood that a computing device 1500 may be used to perform the various stages of method 1400. Furthermore, in some embodiments, different operations may be performed by different networked elements in operative communication with computing device 1500. For example, one or more of the user device 505, server 510, and actuation device 515 may be employed in the performance of some or all of the stages in method 1400. Moreover, one or more of the user device 505, server 510, and actuation device 515 may be configured much like computing device 1500. Similarly, apparatus 100 may be employed in the performance of some or all of the stages in method 1400. Apparatus 100 may also be configured much like computing device 1500.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 1400 will be described in greater detail below.

According to various aspects of the disclosure, the devices and systems of the present invention provides a number of advantages of current options. Without wishing to be bound by a particular theory, the combination of inventive configurations, device construction and positioning allow the disclosed devices and systems to be effective with existing breaker box and circuit breaker models and types. In further aspects, the disclosed systems and devices can selectively control power to larger areas of a user's home.

Also disclosed herein are methods of using the disclosed devices and systems. For example, in another exemplary aspect, the present disclosure provides a method for actuating a circuit breaker in a breaker box using a disclosed device or system. In further aspects, FIG. 6 is a flow chart setting forth the general stages involved in a method 1400 consistent with an embodiment of the disclosure for operating the disclosed devices and systems. Method 1400 may be implemented using, at least in part, a controller 1500 (e.g., on-board computing device) as described in more detail below with respect to FIG. 9 Controller 1500 may comprise a controller for operating the devices and device components as well as well as performing other operational tasks, including, but not limited to, actuation control and parameters, and communication. As such, controller 1500 may be in operative configuration and communication with, for example, but not be limited to, actuator units, drive units, communication module, power source, power regulator, various telemetry sensors, transceivers and antennas. As will be detailed with reference to FIG. 5, controller 1500 may comprise a remote communication module to enable remotely operation as described herein. In other embodiments, controller 1500 may be completely self-operating upon configuration.

Furthermore, although stages are disclosed with reference to controller 1500, it should be understood that a plurality of other components may enable the operation of method 1400, including, but not limited to, other computing components, mechanical components, environment properties (e.g., temperature), electrical conditions, and the like.

Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1400 may begin at starting block 1405 and proceed to stage 1410, where the actuation device may be installed and configured for a breaker box. Installing the actuation device may include, for example, positioning the device such that the actuation device is capable of interacting with the plurality of switches or circuit breakers within the breaker box.

Configuring the device may begin by creating a user account for the platform. In embodiments, configuring the actuation device for a breaker box may include determining a breaker box size and layout. A user may provide the platform with data specifying the breaker box and the plurality of breakers within the breaker box. In some embodiments, each breaker may be specified individually. In some embodiments, a plurality of breakers may be combined into a single group, and may be controlled together. In some embodiments, the user may specify, for one or more (e.g., each) circuit breaker or switch, one or more electrical devices connected to the circuit attached to that breaker or switch).

From stage 1410, the method 1400 may proceed to stage 1420 where the platform components are put into standby or monitoring modes. In some embodiments, placing the platform in standby mode or monitoring mode may include causing the actuation device to enter a power saving mode, and/or to halt movement of the device. In some embodiments, the platform may continue to monitor one or more sensors (e.g., including, but not limited to, sensors deployed in the panel and/or platform assembly). In embodiments, data from the sensors may be stored and/or processed by the platform.

The method 1400 may proceed to stage 1430, where the platform may activate one or more device (e.g., the circuit breaker actuation device). In some embodiments, the platform may activate devices in response to receipt of a command from the user (e.g., via a wireless device in the control of the user). Additionally or alternatively, the platform may activate devices in response to a reading from one or more of the sensors exceeding a threshold status. Upon activation, the platform may be placed in an active state to receive commands (e.g., to actuate a breaker). For example, the platform may activate the actuation device. In some embodiments, activation of the platform may cause more frequent monitoring of the one or more sensors. The activation of device components, though disclosed in a particular order for illustrative purposes, may occur in other arrangements.

In some aspects, an advantage of the invention can be that it allows a user to turn off a circuit remotely from the breaker box. In some aspects, an advantage of the invention can be that it allows a user to turn on a circuit remotely from the breaker box. In some aspects, a user may activate or deactivate (and/or otherwise control operation of) the device by using a control unit, such as a wireless device or mobile device that is in operative communication with the actuation device. The wireless device may be a device that may be used for additional purposes other than use with the invention such as a mobile phone, tablet computer, notebook computer, desktop computer, etc. Alternatively, the platform may provide a specialized wireless device for use with the actuation device.

In embodiments, the actuation device may include, among other things, a controller (e.g., Controller 1500) and one or more drive units. For example, a first drive unit may allow the device to move vertically relative to the breaker box, and a second drive unit may cause actuation of a circuit breaker. In some embodiments, the controller 1500 (e.g., on-board computing-device) may activate device elements (e.g., the one or more drive units) in response to the controller receiving an activation signal from the platform. Additionally or alternatively, the controller 1500 may activate the one or more drive units in response to a certain reading from one or more sensors (e.g., including, but not limited to, sensors deployed in the panel and/or platform assembly) in communication with the controller. For example, activation of one or more actuation units, selected from among the drive units, may be dependent on certain environmental factors and/or electrical conditions such as, for example, temperature, power consumption, voltage, current and the like. Controller 1500 may be configured to trigger activation of device components upon the satisfaction of certain pre-set conditions. Such conditions may be defined prior to activation.

Figure 7:
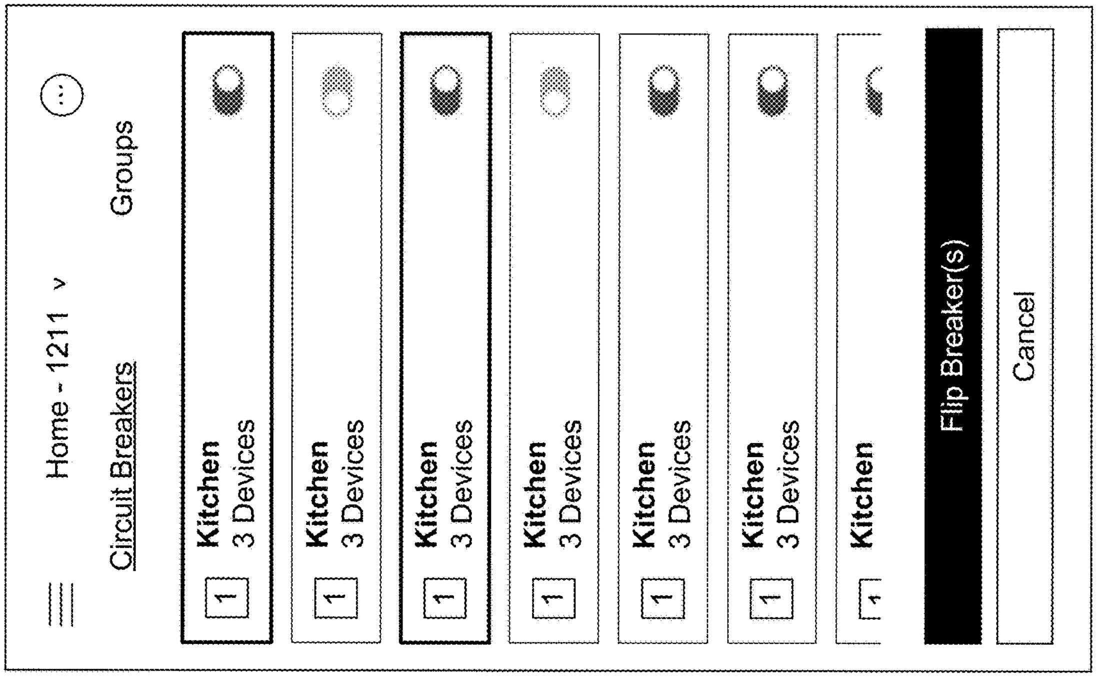
FIG. 7 shows a screenshot of an example software interface for selecting circuit breakers to be actuated by the system.

From stage 1430, where the device components are activated, method 1400 may proceed to stage 1440, where the platform receives one or more instructions (e.g., via the wireless device). In embodiments, the one or more instructions may indicate one or more switches or circuit breakers to be actuated. In some embodiments, the one or more instructions may indicate a final state of each switch or circuit breaker e.g., after the instructed actuation). In some embodiments, the instructions may specify one or more criteria to be met prior to actuating at least one of the one or more switches or circuit breakers. For example, as shown in FIG. 7, a user may select a plurality of switches for actuation. In some embodiments, the user may confirm the list of circuit breakers or switches to be actuated.

From stage 1440, where the instructions are received, the method 1400 may proceed to stage 1450, where a switch is selected for actuation from among the one or more switches indicated in the received instructions. In embodiments, selecting the switch for activation may include ordering the one or more switches or circuit breakers to be actuated. The switches or circuit breakers may be ordered according to any useful criteria. For example, the switches or circuit breakers may be ordered based on a position of the switches, relative to the actuation device.

From stage 1450, where the switch or circuit breaker is selected, the method 1400 may proceed to stage 1460, where the platform may determine whether the selected switch or circuit breaker meets qualifications for actuation. In embodiments, meeting qualifications for actuation may include determining if a current status of the switch or circuit breaker is different from the final state of the switch or circuit breaker received in the instructions in stage 1440. For example, if the received final state is "off", then the system may determine that the current state of the switch or circuit breaker is not "off".

In some embodiments (e.g., where the selected switch is associated with one or more criteria to be met before actuation), determining whether the selected switch or circuit breaker meets qualifications for actuation may include determining whether the one or more criteria have been met. For example, if the criterion is a specific time, then the platform may compare a current time to the specific time. As another example, if the criterion is a particular current flow in the circuit to which the selected switch or breaker is attached, the platform may compare a most recently measured current flow to the particular current flow.

If the selected switch or circuit does meet qualifications for actuation (YES in stage 1460), the method 1400 may proceed to stage 1470, where the platform may utilize one or more drive units to actuate the selected switch or circuit breaker.

In embodiments, a first drive unit may be used to adjust a position of the actuation device relative to the breaker panel. In particular, the first drive unit may adjust a vertical position of the actuation device by moving linearly up and/or down so that a second drive unit (e.g., an actuator) is positioned to be in operative communication with the switch or circuit breaker specified in the received instructions. A second drive device, known as an actuator may be used to actuate the switch or circuit breaker. In embodiments, actuating a switch or circuit breaker may comprise toggling the switch or circuit breaker from an "on" state to an "off" state or toggling the switch or circuit breaker from an "off" state to an "on" state.

From stage 1470, where the device is used to actuate the selected breaker or switch, or if the selected breaker or switch does not meet qualifications for actuation (NO in stage 1460), the method 1400 may proceed to stage 1480, where the platform may determine if there are more switches or circuit breakers indicated in the instructions received in stage 1440 to be actuated.

Figure 8A:
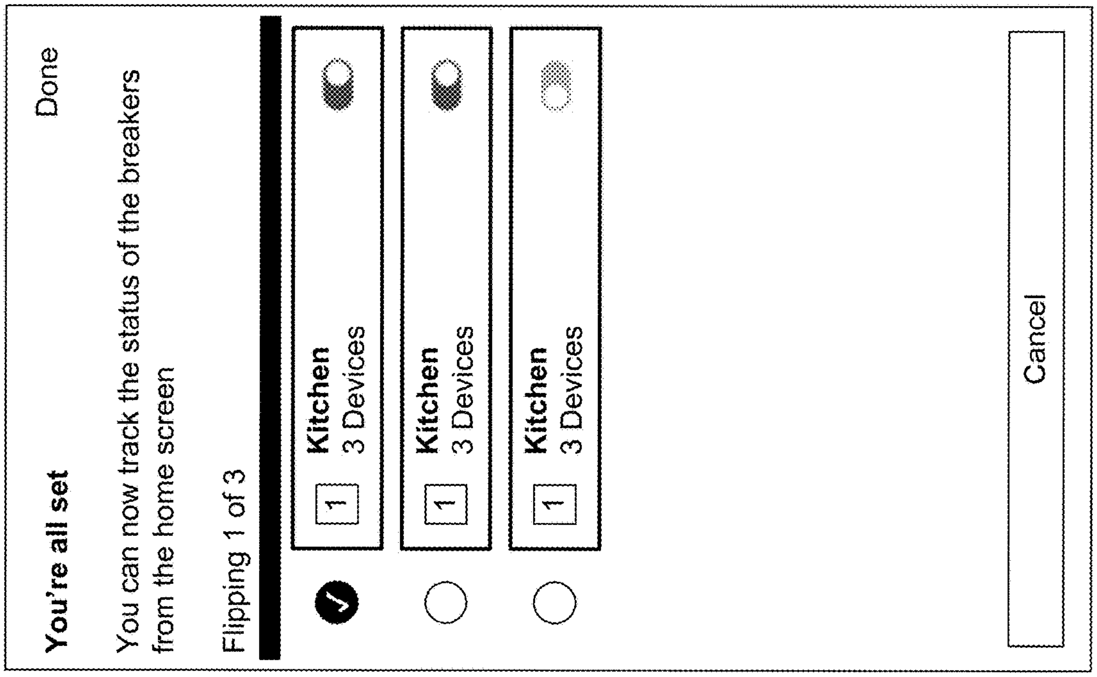
FIG. 8A shows a screenshot of an example software interface for indicating partial completion of circuit breaker actuation.
Figure 8B:
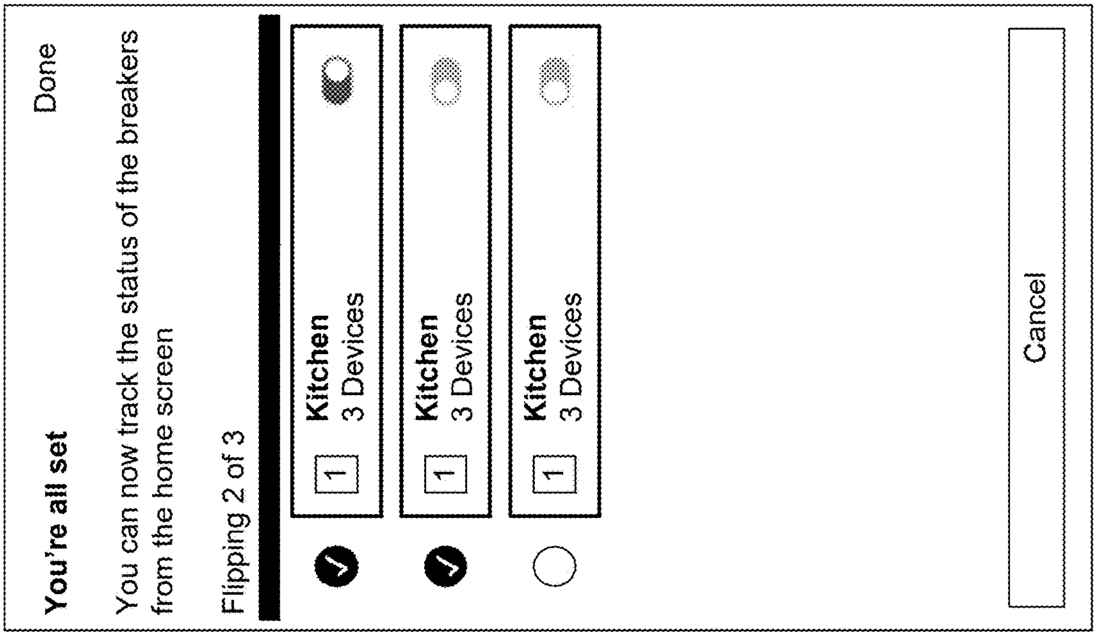
FIG. 8B shows a screenshot of an example software interface for indicating partial completion of circuit breaker actuation.

If there are more switches or circuit breakers indicated in the instructions (YES at stage 1480), the method 1400 may return to stage 1450 to select another switch or circuit breaker. For example, as shown in FIGS. 8A and 8B, the platform may indicate switches that have been actuated, and switches that have not yet been actuated.

Figure 8C:
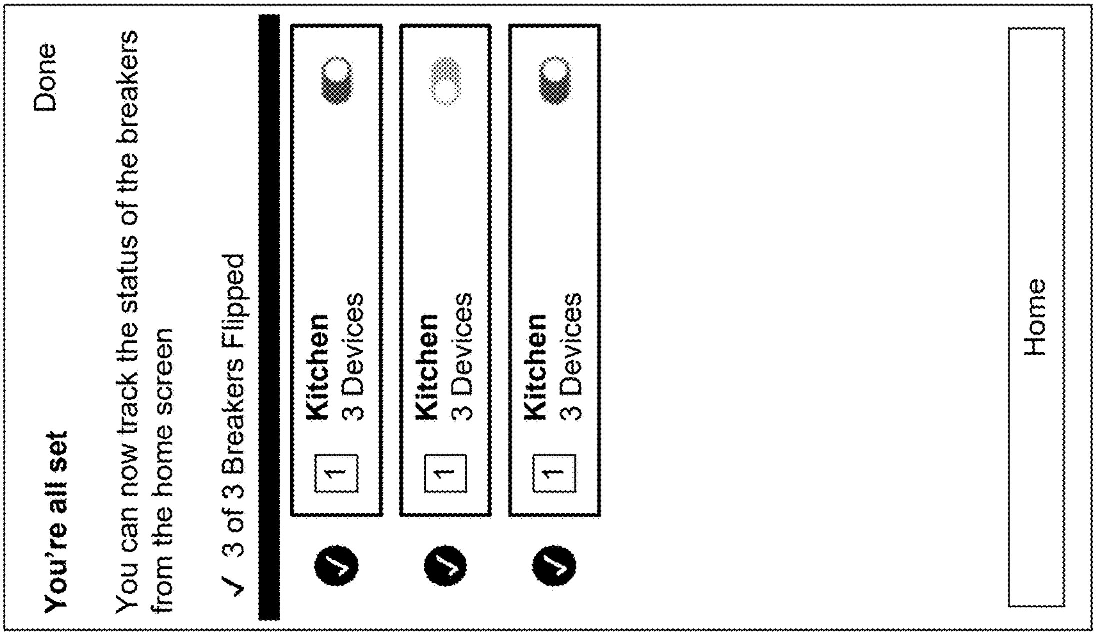
FIG. 8C shows a screenshot of an example software interface for indicating completion of circuit breaker actuation.

Alternatively, if there are no more switches or circuit breakers indicated in the instructions (NO at stage 1480), the method 1400 may return to a standby or monitoring state at stage 1420. For example, as shown in FIG. 8C, the platform may indicate that all switches have been actuated.

During all stages, the devices may be in operable communication with the user via the wireless communication component. The user may receive various readings from the various device components. In some embodiments, the user may control the operation of the actuation device during use. For example, the user may be able to control the device components, including, but not limited to, actuator units, drive units, communication module, power source, power regulator, various telemetry sensors, transceivers and antennas.

In other embodiments, the integrated controller 1500 may be pre-configured with operational control instructions and/or data. In various aspects, the disclosed devices and systems may comprise, but not be limited to, an integrated controller and/or on-board computing module. The computing module may be in operative configuration and communication with, for example, but not be limited to, actuator units, drive units, communication module, power source, power regulator, various telemetry sensors, transceivers and antennas. Further, the computing module may be in operative communication with another computing device consistent with the description herein, and may comprise, but not be limited to, a wireless device, smart phone, desktop computer, laptop, a tablet, or mobile telecommunications device. Such remote devices may be used to control and/or configure integrated computing module (e.g., activation conditions, operating parameters and settings, and the like).

Moreover, the devices may be in operative communication with a centralized server, such as, for example, a cloud computing service. Although operation has been described to be performed, in part, by a controller 1500, it should be understood that, in some embodiments, different operations may be performed by different networked elements in operative communication with controller 1500.

Embodiments of the present disclosure may comprise a system having a memory storage and a processing unit. The processing unit may be coupled to the memory storage, wherein the processing unit is configured to perform the stages of method 1400.

Figure 9:
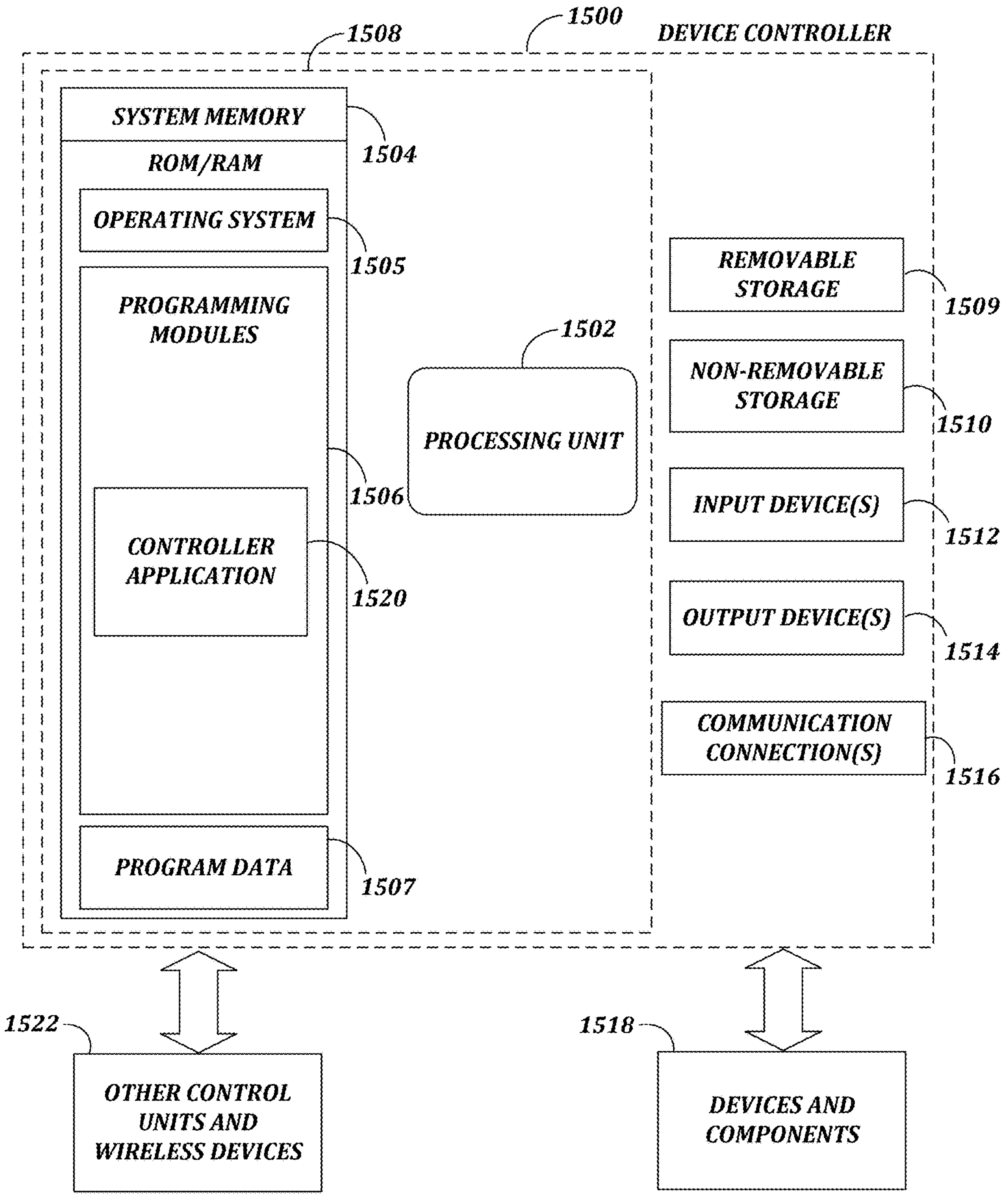
FIG. 9 shows a block diagram of a system including a computing device for enabling operation of the disclosed devices and systems in accordance with another exemplary embodiment of the present invention.

FIG. 9 is a block diagram of a system including controller 1500. Consistent with an embodiment of the disclosure, the aforementioned memory storage and processing unit may be implemented in a computing device, such as controller 1500. Any suitable combination of hardware, software, or firmware may be used to implement the memory storage and processing unit. For example, the memory storage and processing unit may be implemented with controller 1500 or any of devices and components 1518, or any other control unit and wireless devices 1522, in combination with controller 1500. Other devices and components 1518 may comprise, for example, but not be limited to, control mechanisms, actuator units, drive units, communication module, power source, power regulator, various telemetry sensors, transceivers and antennas. The aforementioned system, device, and processors are examples and other systems, devices, and processors may comprise the aforementioned memory storage and processing unit, consistent with embodiments of the disclosure.

With reference to FIG. 9, a system consistent with an embodiment of the disclosure may include a computing device, such as controller 1500. In a basic configuration, controller 1500 may include at least one processing unit

1502 and a system memory 1504. Depending on the configuration and type of computing device, system memory 1504 may comprise, but is not limited to, volatile (e.g. random-access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling controller 1500's operation. In one embodiment, programming modules 1506 may include controller application ("app") 1520. Furthermore, embodiments of the disclosure may be practiced in conjunction with a graphics library, other operating systems, or any other application program and is not limited to any particular application or system. This basic configuration is illustrated in FIG. 9 by those components within a dashed line 1508.

Advantageously, the app may provide a user with information as well as be the user's interface to operating the embodiment of the invention. The app may include one or more graphic user interfaces (GUIs). Among the GUIs of the app may be a GUI allowing the user to pick which circuit breaker to actuate, and to select (if available) one or more operating parameters or characteristics (such as schedule or frequency) of the actuator units. The user may be able to adjust such selections without having to deactivate the embodiment from a GUI of the app. The user may also use the app to turn on and turn off the device components.

Another advantage of the app is that the app may present the user with a GUI that depicts the breaker box and circuit breaker layout and shows which circuit breaker will be switched. The GUI may include additional or other information relating to the circuit breaker such as the light and/or outlets on the circuit. The additional or other information may be color coded and/or otherwise presented so as to be readily understood by the user by looking at the GUI of the app. The app may also present the user with information received from the device components, such as environmental, telemetry, and electrical data.

Controller 1500 may have additional features or functionality. For example, controller 1500 may also include additional data storage devices (removable and/or non-removable) such as, for example, magnetic disks, optical disks, or tape. Such additional storage is illustrated in FIG. 9 by a removable storage 1509 and a non-removable storage 1510. Computer storage media may include volatile and nonvolatile, removable and non-removable media implemented in any method or technology for storage of information, such as computer readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by controller 1500. Any such computer storage media may be part of device 1500. Controller 1500 may also be operative with input device(s) 1512 such as a keyboard, a mouse, a pen, a sound input device, a touch input device, etc. Input device(s) 1512 may be used to, for example, manually access and program controller 1500. Output device(s) 1514 such as a display, speakers, a printer, etc. may also be included. The aforementioned devices are examples and others may be used.

Controller 1500 may also contain a communication connection 1516 that may allow device 1500 to communicate with other control units and wireless devices 1522 as well as devices and other components 1518 (e.g., transceivers, sensors, etc.), such as over an encrypted network in a distributed computing environment. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, Bluetooth, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., controller application 1520) may perform processes including, for example, one or more of stages or portions of stages of method 1400 as described above. App 1520 may be configured to operate device components 1518 and receive instructions from, for example, communications connections module 1516. The aforementioned process is an example, and processing unit 1502 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A device for controlling a plurality of circuit breakers, the device comprising:

a panel for covering at least a portion of a breaker box, the panel being configured to be removably secured to the breaker box;

a rail assembly connected to the panel, comprising a first rail and a second rail extending substantially in parallel with the first rail along a length of the panel;

a platform assembly slidably mounted on the panel and configured to travel linearly along the rail assembly, wherein the first rail and the second rail are disposed at opposite sides of the platform assembly;

a drive unit configured to move the platform assembly along the rail assembly;

an actuator unit mounted on the platform assembly, the actuator unit being configured to actuate at least one circuit breaker of the plurality of circuit breakers, the actuator unit being configured to exert a force on the at least one circuit breaker;

at least one sensor configured to measure at least one of: power, current, voltage, power factor, temperature, or frequency at the at least one circuit breaker; and a controller configured to control operation of at least one of the drive unit and the actuator unit based on instructions regarding operation of the device and data received from the at least one sensor.

2. The device of claim 1, wherein the controller comprises:

a first sub-controller for controlling the drive unit; and a second sub-controller for controlling the actuator unit.

3. The device of claim 1, wherein the actuator unit comprises a motor and an arm rotatably mounted to the motor, such that the motor drives the arm to rotate, thereby actuating the at least one circuit breaker.

4. The device of claim 1, wherein the drive unit comprises a worm screw operated by a motor, and wherein the platform assembly defines an aperture configured to receive the worm screw.

5. The device of claim 1, further comprising a power source, wherein the power source comprises at least one of: a particular circuit breaker of the plurality of circuit breakers, a power adapter, or a battery.

6. The device of claim 1, wherein actuating comprises at least one of:

moving a lever of the at least one circuit breaker to an "off" position, and moving the lever of the at least one circuit breaker to an "on" position.

7. The device of claim 1, wherein the drive unit is configured to move the platform assembly to a location corresponding to a position of the at least one circuit breaker based on the instructions.

8. The device of claim 1, further comprising a housing that at least partially surrounds the panel, the rail assembly, the platform assembly, the controller, the drive unit, and the actuator unit.

9. The device of claim 1, further comprising a control unit communicatively connected to the controller, the control unit being configured to transmit the instructions regarding the operation of the device to the controller.

10. The device of claim 9, wherein the control unit comprises a mobile device having application software configured to transmit the instructions regarding the operation of the device to the controller.

11. The device of claim 1, wherein the panel is configured to pivotably connect to a portion of the breaker box.

12. The device of claim 11, wherein the panel is pivotably connected to the breaker box using a hinged connector.

13. A system for controlling circuit breakers, the system comprising:

an electrical breaker box housing an electrical panel comprising a plurality of slots configured to receive the circuit breakers;

a plurality of circuit breakers installed in the plurality of slots;

a substantially planar breaker box cover panel pivotably connected to the electrical breaker box, and configured to at least partially cover the electrical breaker box;

a frame member connected to the substantially planar breaker box cover panel, the frame member comprising a first rail and a second rail extending substantially in parallel with the first rail along a length of the panel;

a platform assembly connected to the frame member and configured to travel along the frame member, wherein the first rail and the second rail are disposed at opposite sides of the platform assembly;

a drive unit configured to move the platform assembly along the frame member;

an actuator unit configured to actuate at least one circuit breaker of the plurality of circuit breakers;

at least one sensor configured to measure at least one of: power, current, voltage, power factor, temperature, or frequency at the at least one circuit breaker;

a controller configured to control operation of at least one of the drive unit or the actuator unit based on instructions regarding operation of the system and data received from the at least one sensor; and a power source configured to power at least one of the controller, the drive unit, or the actuator unit.

14. The system of claim 13, further comprising a control unit communicatively connected to the controller, the control unit being configured to transmit the instructions regarding the operation of the system to the controller.

15. The system of claim 13, wherein the power source comprises at least one of: a particular circuit breaker of the plurality of circuit breakers, a power adapter, or a battery.

16. A method for remotely actuating a circuit breaker comprising:

receiving, at a control device, an indication of one or more circuit breakers to be actuated;

measuring at least one of: power, current, voltage, power factor, temperature, or frequency at the one or more circuit breakers included in the indication;

based on the received indication and the measurement, transmitting one or more instructions from the control device to a circuit breaker actuating device connected to a circuit breaker panel;

activating the circuit breaker actuating device;

moving a platform of the circuit breaker actuating device along a rail assembly comprising a first rail and a second rail disposed at opposed sides of the platform, the first rail and the second rail extending substantially in parallel along a length of a circuit breaker panel, based on the one or more instructions, such that the platform is located adjacent to a first circuit breaker of the one or more circuit breakers;

causing an actuator on the circuit breaker actuating device to actuate the first circuit breaker; and causing the circuit breaker actuating device to enter a standby state.

17. The method of claim 16, wherein the indication comprises one or more criteria for actuating the first circuit breaker, and wherein the platform is moved responsive to determining that the one or more criteria for actuating the first circuit breaker have been met.

18. The method of claim 16, wherein the indication of the one or more circuit breakers further comprises an indication of a second circuit breaker to be actuated, the method further comprising:

moving the platform of the circuit breaker actuating device along the rail assembly based on the one or more instructions, such that the platform is located adjacent to the second circuit breaker of the one or more circuit breakers; and causing the actuator on the circuit breaker actuating device to actuate the second circuit breaker.

* * * * *